United States Patent
Horiguchi et al.

(10) Patent No.: US 9,834,669 B1
(45) Date of Patent: Dec. 5, 2017

(54) METHOD FOR PRODUCING POLYACETAL RESIN COMPOSITION

(71) Applicant: Polyplastics Co., Ltd., Tokyo (JP)

(72) Inventors: Tadahiro Horiguchi, Fuji (JP); Akihide Shimoda, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/538,008

(22) PCT Filed: Nov. 9, 2015

(86) PCT No.: PCT/JP2015/081436
§ 371 (c)(1),
(2) Date: Jun. 20, 2017

(87) PCT Pub. No.: WO2016/125358
PCT Pub. Date: Aug. 11, 2016

(30) Foreign Application Priority Data

Feb. 6, 2015 (JP) .................................. 2015-022382

(51) Int. Cl.
*C08G 63/02* (2006.01)
*C08L 59/04* (2006.01)

(52) U.S. Cl.
CPC ......... *C08L 59/04* (2013.01); *C08L 2205/025* (2013.01)

(58) Field of Classification Search
CPC ...................................................... C08L 59/04
USPC ......................................................... 525/461
See application file for complete search history.

(56) References Cited

U.S. PATENT DOCUMENTS

2005/0182200 A1  8/2005  Kawaguchi et al.
2011/0077378 A1  3/2011  Haubs et al.

FOREIGN PATENT DOCUMENTS

| JP | 2002-003694 A | 1/2002 |
| JP | 2003-105048 A | 4/2003 |
| JP | 2003-342442 A | 12/2003 |
| JP | 2011-068855 A | 4/2011 |
| JP | 2013-032453 A | 2/2013 |

*Primary Examiner* — Terressa Boykin
(74) *Attorney, Agent, or Firm* — Knobbe Martens Olson & Bear LLP

(57) ABSTRACT

A polyacetal resin composition which is suppressed low in formaldehyde generation, while having high stiffness and high toughness. The resin is produced by a method including blending from 0.1 part by weight to 2 parts by weight (inclusive) of a polyacetal copolymer having a branched or crosslinked structure, which is a copolymer of a trioxane, a compound having from 3 to 4 (inclusive) cyclic ether units in each molecule and a compound having one cyclic ether unit in each molecule, per 100 parts by weight of a linear polyacetal copolymer which contains an oxymethylene unit as a main constituent, while containing, as a comonomer unit, an oxyalkylene unit at a ratio of from 0.4% by mole to 0.9% by mole (inclusive) relative to the constituents of the linear polyacetal copolymer, the linear polyacetal copolymer being obtained by copolymerization wherein a heteropolyacid or the like is used as a polymerization catalyst.

2 Claims, No Drawings

US 9,834,669 B1

METHOD FOR PRODUCING POLYACETAL RESIN COMPOSITION

This application is the U.S. National Phase under 35 U.S.C. §371 of International Application PCT/JP2015/081436, filed Nov. 9, 2015, designating the U.S., and published in Japanese as WO 2016/0125358 on Aug. 11, 2016, which claims priority to Japanese Patent Application No. 2015-022382, filed Feb. 6, 2015, the entire contents of which are incorporated herein by reference.

TECHNICAL FIELD

The present invention relates to a method for producing a polyacetal resin composition.

BACKGROUND ART

A polyacetal resin, also referred to as a POM resin, has many excellent properties such as mechanical properties, thermal properties, electrical properties, slidability, formability, and the like, and is widely used mainly as a structural material or a mechanical component and the like in electrical devices, automobile components, precision machinery components, and the like. However, as the fields of application of polyacetal resins have broadened, there has been a tendency for the required properties to become increasingly advanced, numerous, and specialized.

As one example of this, there is a requirement for a material which, while maintaining the inherently excellent formability, surface appearance, and the like of polyacetal resin, has further improved stiffness, surface hardness, sliding properties and the like. In response to such requirements, as a means of increasing the stiffness, a method of filling the polyacetal resin with a fibrous filler is common, but there are problems with this method such as inferior external appearance, a decline in sliding characteristics, and the like, of the molded product.

In order to increase the stiffness, there has been proposed a polyacetal resin wherein 99.9 to 90 parts by weight of (A) a linear polyacetal resin having a melt index of 1 to 50 g/min and obtained by copolymerizing 99.5 to 97.5% by weight of (a) trioxane and 0.5 to 2.5% by weight of (b) a compound selected from a monofunctional cyclic ether compound and a monofunctional cyclic formal compound, is blended with 0.1 to 10 parts by weight of (B) a branched or crosslinked polyacetal resin having a melt index of 0.1 to 10 g/min and obtained by copolymerizing 99.49 to 95.0% by weight of (a) trioxane, 0.5 to 4.0% by weight of (b) a compound selected from a monofunctional cyclic ether compound and monofunctional cyclic formal compound and 0.01 to 1.0% by weight of (c) a polyfunctional glycidyl ether compound with a functional group number of 3 to 4, wherein the (A) linear polyacetal resin and the (B) branched or crosslinked polyacetal resin are selected such that a ratio of the melt index of the (A) linear polyacetal resin and the melt index of the (B) branched or crosslinked polyacetal resin satisfies the relation $0.02 \leq MI_B/MI_A \leq 1.5$ (where $MI_A$ is a melt index of the (A) linear polyacetal resin and $MI_B$ is a melt index of the (B) branched or crosslinked polyacetal resin) (for example, refer to Patent Document 1). The polyacetal resin composition disclosed in Patent Document 1 is excellent in having high stiffness, dimensional stability, and creep properties.

Further, in order to increase the sliding properties, there has been proposed a polyacetal resin composition wherein, with respect to 100 parts by weight of (A) a polyacetal resin, there is blended 0.01 to 100 parts by weight of (B) a polyacetal copolymer having a total terminal group amount of 15 to 150 mmol/kg and obtained by copolymerizing 100 parts by weight of (a) trioxane, and 0.0005 to 2 parts by weight of (b) a compound having two or more cyclic ether units in each molecule, and 0 to 20 parts by weight of (c) a compound having one cyclic ether unit in each molecule (for example, refer to Patent Document 2). The polyacetal resin composition disclosed in Patent Document 2 is excellent in stiffness, surface hardness, and sliding properties. Further, the polyacetal resin composition disclosed in Patent Document 2 has suitable toughness because the total terminal group amount of the (B) component is suppressed to be no greater than a fixed amount.

Patent Document 1: Japanese Unexamined Patent Application, Publication No. 2003-342442

Patent Document 2: Japanese Unexamined Patent Application, Publication No. 2002-003694

DISCLOSURE OF THE INVENTION

Problems to be Solved by the Invention

In recent years, there has been demand for a high quality polyacetal copolymer having especially excellent thermal stability, and an extremely low formaldehyde generation amount. Thus, there has been demand for further improvement in suppressing to a low level the formaldehyde generation amount, while having high stiffness and high toughness.

The present invention has the objective of providing a polyacetal resin composition which, while having high stiffness and high toughness, suppresses the formaldehyde generation amount to as low a level as possible.

Means for Solving the Problems

The inventors of the present invention, as a result of diligent study to achieve the above objective, discovered that the above objective can be achieved by comprising, in a specified proportion, a linear polyacetal copolymer copolymerized with a heteropoly acid as a polymerization catalyst and including a fixed ratio of an oxyalkylene unit as a comonomer unit, and a trifunctional or tetrafunctional polyacetal copolymer having a branched or crosslinked structure, and thus completed the present invention. More specifically, the present invention provides the following.

The first aspect of the present invention is a method for producing a polyacetal resin composition comprising a step of blending, with respect to 100 parts by weight of (A) a linear polyacetal copolymer comprising an oxymethylene unit as a main constituent component and an oxyalkylene unit as a comonomer in a percentage of from 0.4 mol % to 0.9 mol % of the constituent units of the linear polyacetal copolymer, and produced with at least one selected from a heteropoly acid, isopoly acid, or an acid salt thereof as a polymerization catalyst; from 0.1 parts by weight to 2 parts by weight of (B) a polyacetal copolymer having a branched or crosslinked structure and which is a copolymer of (b1) trioxane, (b2) a compound having from 3 to 4 cyclic ether units in each molecule, and a compound (b3) having one cyclic ether unit in each molecule.

The second aspect of the present invention is a method for producing a polyacetal resin composition according to the first aspect, wherein in a catalyst quenching when producing the (A) linear polyacetal copolymer, a melt-kneading treatment is carried out using a carbonate, bicarbonate, or carboxylate of an alkali metal element or alkaline metal earth element as a quenching agent.

Effects of the Invention

According to the present invention, it is possible to provide a polyacetal resin composition which, while having high stiffness and high toughness, suppresses the formaldehyde generation amount to as low a level as possible.

PREFERRED MODE FOR CARRYING OUT THE INVENTION

Below, specific embodiments of the present invention are explained in detail, but the present invention is not in any way limited to these embodiments and may be practiced with the addition of suitable modifications within the scope of the objective of the present invention.

<Method for Producing the Polyacetal Resin Composition>

The polyacetal resin composition comprises a prescribed weight ratio of a linear polyacetal copolymer copolymerized with a heteropoly acid as the polymerization catalyst and comprising a fixed ratio of oxyalkylene units as comonomer units, and a polyacetal copolymer with 3 functional groups or 4 functional groups and having a branched or crosslinked structure.

[(A) Linear Polyacetal Copolymer]

The (A) linear polyacetal copolymer comprises oxymethylene units as the main constituent component, and oxyalkylene units as comonomer units in a percentage of from 0.4 mol % to 0.9 mol % of the constituent units of the (A) linear polyacetal copolymer. In the present embodiment, the linear polyacetal copolymer is a linear polymer wherein oxyalkylene monomer units are randomly inserted into a polymer chain consisting of oxymethylene monomer units. Below, the (A) linear polyacetal copolymer may also be referred to as the "(A) component".

The (A) component can be positioned as the base resin. The (A) component is a polyacetal compolymer having oxymethylene units ($—CH_2O—$) as the main constituent unit, and has comonomer units other than the oxymethylene group.

As the main raw material of the (A) component, (a1) trioxane is widely used. Trioxane is an annular trimer of formaldehyde, and is generally obtained by reacting a formaldehyde aqueous solution under the presence of an acidic catalyst, and this is purified by a method such as distillation or the like, and used. The (a1) trioxane is preferably one which, to the greatest extent possible, is free of impurities such as water, methanol, formic acid, or the like.

For the (A) component, the comonomer units include oxyalkylene units (for example, oxyethylene group ($—CH_2CH_2O—$), oxybutylene group ($—CH_2CH_2CH_2CH_2O—$) and the like).

The proportion of the comonomer units is from 0.4 mol % to 0.9 mol % as the percentage of the constituent units of the linear polyacetal copolymer. If the proportion of the comonomer units is too low, there is the possibility that the released amount of formaldehyde will increase, which is not preferable. Further, if the proportion of the comonomer units is too high, there is the possibility that even when blending with a suitable proportion of the (B) component, sufficient stiffness cannot be obtained, which is not preferable. Specifically, if the proportion of the comonomer is too high, there is the possibility that the flexural modulus of elasticity of a test piece in conformance with ISO 178 will be below 2700 MPa.

The carbon number of the oxyalkylene units is not particularly limited, but is preferably from 2 to 4.

As examples of the comonomer, (a2) one or more compounds selected from a monofunctional cyclic ether compound and a monofunctional cyclic formal compound may be mentioned. In the present embodiment, a monofunctional cyclic ether compound is a compound having one cyclic ether unit in each molecule, and a monofunctional cyclic formal compound is a compound having one cyclic formal compound in each molecule. Specifically, ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, ethylene glycol formal, propylene glycol formal, diethylene glycol formal, triethylene glycol formal, 1,4-butanediol formal, 1,5-pentanediol formal, 1,6-hexanediol formal, and the like may be mentioned.

The melt index (referred to as "MI") of the (A) component is not particularly limited, but in consideration of the points of strength and formability, is preferably from 7 g/10 min to 20 g/10 min, and is more preferably from 9 g/10 min to 15 g/10 min. In the present embodiments, the melt index is taken as a characteristic value corresponding to the molecular weight. A lower MI indicates a higher molecular weight, and a higher MI indicates a lower molecular weight. If the melt index is too small, the flowability is reduced, and there is the possibility that problems will arise with the formability. Further, if the melt index is too large, there is the possibility that this will result in a reduction in the strength. Further, in the present embodiments, the melt index is the value measured under the conditions of 190° C., and a load of 2160 g according to ASTM D-1238.

The (A) component may be a terpolymer constituted of three components, or the like. The polyacetal compolymer, other than a random copolymer, may also be a block copolymer, or the like.

[Method for Producing the (A) Component]

For the production of the (A) component the polymerization apparatus is not particularly limited, and a publicly known apparatus may be used, and any of the methods of batch type, continuous type and the like are possible.

The (A) component can generally be obtained by a method such as adding a suitable amount of a molecular weight adjusting agent and carrying out bulk polymerization using a cationic polymerization catalyst, or the like. As the molecular weight adjusting agent, a low molecular weight acetal compound having an alkoxy group such as methylal, methoxymethylal, dimethoxymethylal, trimethoxymethylal, oxymethylene di-n-butyl ether and the like, an alcohol such as methanol, ethanol, butanol and the like, and the like may be mentioned.

In the present embodiments, a heteropoly acid, isopoly acid, or an acid salt thereof is used as the polymerization catalyst. These may also be used diluted in advance in an organic solvent or the like. In the present embodiments, by making the polymerization catalyst a heteropoly acid, isopoly acid, or an acid salt thereof, by combined use with the (B) component explained later, it is possible to provide a polyacetal resin composition which, while having high stiffness and high toughness, can suppress the formaldehyde generation amount to as low a level as possible.

In particular, for the toughness, it is possible to implement a high Charpy impact strength (notched, 23° C.) of 6 kJ/m$^2$ or more. Further, in the present embodiments, the Charpy impact strength is the Charpy impact strength value at 23° C. for a notched Charpy test piece prepared by injection molding in accordance with ISO 179/1eA.

Additionally, for the formaldehyde generation amount, compared to other polymerization catalysts, it is possible to suppress the formaldehyde generation amount to a low level.

As the polymerization catalyst, a compound comprising at least one selected from a heteropoly acid, an isopoly acid, or an acid salt thereof may be mentioned. A heteropoly acid is a polyacid generated by dehydration condensation of heterogeneous oxyacids, with a specified heterogeneous element present in its center, and has a mononuclear or polynuclear complex ion which can condense a condensation acid group sharing an oxygen atom. An isopoly acid is also referred to as an iso polyacid, homonuclear polyacid, or homogeneous polyacid, and is a high molecular weight inorganic oxyacid formed from a condensate of an inorganic oxyacid having a single type of pentavalent or hexavalent metal.

(Heteropoly Acid or Acid Salt Thereof)

First, the heteropoly acid or acid salt thereof will be explained in detail. The heteropoly acid or acid salt thereof can be represented by the general formula (1).

$$H_x[M_m \cdot M'_n O_l] \cdot yH_2O \quad (1)$$

A heteropoly acid which is especially effective as the polymerization catalyst of the present invention, is the case where the central element M in the above mentioned compositional formula is at least one element selected from P and/or Si, and the coordination element M' is one or more elements selected from W, Mo, and V. From the viewpoint of polymerization activity, it is preferable that the coordination element M' is W or Mo. Further, in the general formula (1), l is 1 to 100, m is 1 to 10, n is 6 to 40, x is 1 or more, and y is 0 to 50.

Further, an acid salt where an $H_x$ in general formula (1) is substituted with various metals or the like may also be used as a catalyst in the present invention.

As specific examples of the heteropoly acid, phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and the like may be mentioned. In particular, from the viewpoint of polymerization activity, the heteropoly acid is preferably one selected from silicomolybdic acid, silicotungstic acid, phosphomolybdic acid, and phosphotungstic acid.

(Isopoly Acid or Acid Salt Thereof)

Next, the isopoly acid or acid salt thereof will be explained in detail. The isopoly acid or acid salt thereof can be represented by the general formula (2) or general formula (3).

$$xM^I_2O \cdot pM^V_2O_6 \cdot yH_2O \quad (2)$$

$$xM^I_2O \cdot pM^{VI}_2O_6 \cdot yH_2O \quad (3)$$

In the general formulas (2) and (3), MI is hydrogen, but may be partially substituted with a metal. MV indicates one or more elements selected from V, Nb, and Ta from group V of the periodic table. MVI indicates one or more elements selected from Cr, Mo, W, and U from group VI of the periodic table. p and x are 1 or more, and y is 0 to 50.

The isopoly acid, besides a method of processing an isopoly acid salt solution in an ion exchange resin, may also be prepared by various methods such as adding a mineral acid to a concentrated solution of an isopoly acid salt and ether extracting, and the like. Further, the present invention is not limited to an isopoly acid, and an acid salt of an isopoly acid may also be used as the polymerization catalyst.

The isopoly acid may be any one of the above described general formulas (2) and (3), but from the viewpoint of polymerization activity, an isopoly acid according to general formula (3) or acid salt thereof is preferable.

As specific examples of suitable isopoly acids, isopolytungstic acids represented by paratungstic acid, metatungstic acid, and the like, isopolymolybdic acids represented by paramolybdic acid, metamolybdic acid, and the like, metapolyvanadic acid, isopolyvanadic acid, and the like may be mentioned. Among these, from the viewpoint of polymerization activity, isopolytungstic acid is preferable.

(Solvent)

In order to uniformly carry out the polymerization reaction, a nonvolatile protonic acid is preferably used by diluting it in an inert solvent free of adverse effects on the polymerization, and is then added to the trioxane and/or comonomer. As the inert solvent, an ester obtained by condensation of a low molecular weight carboxylic acid with a carbon number of 1 to 10 such as formic acid, acetic acid, propionic acid, butyric acid and the like, with a low molecular weight alcohol with a carbon number of 1 to 10 such as methanol, ethanol, 1-propanol, 2-propanol, 1-butanol, 2-butanol, 2-methyl-1-propanol, 2-methyl-2-propanol, 1-pentanol, 3-methyl-1-butanol, 1-hexanol and the like; a low molecular weight ketone with a carbon number of 1 to 10 such as acetone, 2-butanone, 2-pentanone, 3-pentanone, 2-hexanone, 3-hexanone, methylisobutyl ketone, methyl-t-butyl ketone and the like, can be preferably mentioned, but it is not limited to these. Taking also into consideration ease of industrial procurement and the like, methyl formate, ethyl formate, methyl acetate, ethyl acetate, butyl acetate, acetone, 2-butanone, methyl isobutyl ketone and the like are most suitable. The polymerization catalyst is dissolved in the above mentioned inert solvent, suitably at a concentration of 1 to 30 weight/weight %, without being limited to this. Further, a method wherein a prescribed amount of the nonvolatile protonic acid is blended in advance into a partial amount or the full amount of one or a plurality of any of trioxane, a comonomer, a molecular weight adjusting agent and the like, and this solution is then added to the polymerization system and polymerization is carried out, is also preferable.

The amount of the polymerization catalyst is not particularly limited, but is preferably from 0.1 ppm to 50 ppm, and more preferably from 0.1 ppm to 10 ppm with respect to the total of all monomers.

The polymerization temperature is preferably maintained from 65° C. to 135° C.

Next, the quenching of the polymerization catalyst by the addition of a basic compound will be explained.

(Basic Compound)

The type of the basic compound and the addition method are not particularly limited, but in the point of providing quenching of the polymerization catalyst and stabilization of the unstable terminals of the crude polyacetal copolymer by adding the basic compound as it is to the crude polyacetal copolymer, without washing the crude polyacetal copolymer, the basic compound preferably includes at least one selected from carbonates, bicarbonates or carboxylates of alkali metal elements or alkaline earth metal elements, or their hydrates, and triazine ring-containing compounds having an amino group or substituted amino groups. Moreover, in the case of using carbonates, bicarbonates or carboxylates of alkali metal elements or alkaline earth metal elements, or their hydrates, in the composition including the ultimately obtained branched polymer, the formaldehyde generation amount thereof is a particularly low value, which is more preferable. Specifically, it is more preferable to include at least one selected from sodium formate, sodium acetate, sodium carbonate, sodium bicarbonate, disodium succinate, sodium laurate, sodium palmitate, sodium stearate, or calcium stearate.

In the present invention, the above mentioned basic compound may be one type, or a plurality may be used in combination, and may also be their hydrates or mixtures, or in a form of polysalts or the like.

After the polymerization process and the quenching process, if necessary, further well known prior processes such as separating and recovering unreacted monomer, drying, and the like are carried out.

[(B) Polyacetal Copolymer Having a Branched or Crosslinked Structure]

The (B) polyacetal copolymer having a branched or crosslinked structure is a copolymer of (b1) trioxane, (b2) a compound having from 3 to 4 cyclic ether units in each molecule, and (b3) a compound having one cyclic ether unit in each molecule. Below, the (B) polyacetal copolymer having a branched or crosslinked structure may be referred to as the "(B) component".

[(b1) Trioxane]

The (b1) trioxane is the same as the trioxane explained for the (A) component, and is a cyclic trimer of formaldehyde. Concerning the (b1) trioxane, it is also preferably one which, to the greatest extent possible, is free of impurities.

[(b2) Compound Having from 3 to 4 Cyclic Ether Units in Each Molecule]

The (b2) compound having from 3 to 4 cyclic ether units in each molecule is a general term for compounds having, in each molecule, from 3 to 4 cyclic ether units selected from the group consisting of epoxy units, glycidyl units, 1,3-dioxolane units, 1,4-butanediol formal units, diethylenegycol formal units, and 1,3,6-trioxepane units. If the number of cyclic ether units is 2, there is the possibility that sufficient stiffness cannot be obtained. Specifically, there is the possibility that the flexural modulus of elasticity of a test piece according to ISO 178 will be below 2700 MPa. On the other hand, if the number of cyclic ether units is too high, there is the possibility that the toughness will decrease.

Further, as the cyclic ether units, glycidyl units are preferable, and triglycidyl ether compounds and tetraglycidyl ether compounds may be mentioned as preferable compounds. As examples thereof, glycerol triglycidyl ether, trimethylolpropane triglycidyl ether, pentaerythritol tetraglycidyl ether and the like may be mentioned. These compounds may be used individually or two or more may be jointly used and supplied to the copolymerization with the (a) trioxane.

The copolymerization amount of the (b2) compound having from 3 to 4 cyclic ether units in each molecule is not particularly limited but based on suitably obtaining a polyacetal resin composition having the target characteristics, the copolymerization amount is preferably, with respect to 100 parts by weight of the (b1) trioxane, from 0.01 parts by weight to 1 part by weight, more preferably from 0.05 parts by weight to 0.5 parts by weight, and even more preferably from 0.1 parts by weight to 0.3 parts by weight.

[(b3) Compound Having One Cyclic Ether Unit in Each Molecule]

The (b3) compound having one cyclic ether unit in each molecule, in addition to stabilizing the polymerization reaction when producing the (B) component, is also suitable in the point of increasing the thermal stability of the (B) component.

As the (b3) compound having one cyclic ether unit in each molecule, ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, ethylene glycol formal, propylene glycol formal, diethylene glycol formal, triethylene glycol formal, 1,4-butanediol formal, 1,5-pentadiol formal, 1,6-hexanediol formal, and the like may be mentioned. Among these, ethylene oxide, 1,3-dioxolane, 1,4-butanediol formal, and diethylene glycol formal are preferable.

The copolymerization amount of the (b3) compound having one cyclic ether unit in each molecule in the (B) component is not particularly limited but is preferably, with respect to 100 parts by weight of the (b1) trioxane, less than 20 parts by weight, more preferably from 0.05 parts by weight to 15 parts by weight, and more preferably from 0.1 to 10 parts by weight.

[Melt Index]

The melt index of the (B) component is not particularly limited but in consideration of the point of strength, it is preferably from 0.2 g/10 min to 3 g/10 min, and more preferably from 0.5 g/10 min to 1.5 g/10 min. If the melt index is too small, there is the possibility that the toughness will be reduced. Further, if the melt index is too large, there is the possibility that the stiffness will be reduced.

[Method for Producing the (B) Component]

When producing the (B) component, the polymerization apparatus is not particularly limited, and a publicly known apparatus may be used, and any method of the batch type method, continuous flow type method, and the like is possible. Further, the polymerization temperature is preferably maintained from 65° C. to 135° C.

Unlike the production of the (A) component, in the production of the (B) component the type of the polymerization catalyst is not particularly limited. As the polymerization catalyst, a cationic polymerization catalyst may be mentioned, and it is sufficient for the cationic polymerization catalyst to be one which is publicly known. The cationic polymerization catalyst may be used diluted in advance in an organic solvent or the like.

The quenching after the polymerization may be carried out by a previously well known method. For example it may be performed by adding a basic compound or aqueous solution thereof to the produced reactant discharged from the polymerization apparatus after the polymerization reaction, or to the reaction product inside the polymerization apparatus.

The basic compound for neutralizing and quenching the polymerization catalyst is not particularly limited. After the polymerization process and the quenching process, if necessary, further well known prior processes such as washing, separating and recovering unreacted monomer, drying, and the like are carried out.

[Other Components]

The polyacetal resin composition may also comprise other components if necessary. For example, as a stabilizer, one or two or more of any of a hindered phenolic compound, a nitrogen-containing compound, a hydroxide of an alkali or alkaline earth metal, an inorganic salt, a carboxylic acid salt, or the like may be mentioned.

Further, provided that the objective and effects of the present invention are not inhibited, if necessary one type or two or more types of typical additives for thermoplastic resins, for example, a colorant such as a dye, a pigment or the like, a lubricant, a mold release agent, an antistatic agent, a surfactant, or an organic high molecular material, inorganic or organic fiber shaped, grain shaped or plate shaped filler, or the like may be added.

[Preparation of the Polyacetal Resin Composition]

For the preparation of the polyacetal resin composition, it may be easily prepared by a well known generally used method as a prior art resin composition preparation method. For example, after blending each of the components, pellets are obtained by kneading and extruding by an extruder.

The content of the (B) component is from 0.1 parts by weight to 2 parts by weight with respect to 100 parts by weight of the (A) component. If the content of the (B) component is too small, there is the possibility that a polyacetal resin composition having sufficient stiffness cannot be obtained, which is not preferable. If the content of the (B) component is too large, there is the possibility that a polyacetal resin composition having sufficient toughness cannot be obtained, which is not preferable.

EXAMPLES

Below, the present invention is specifically explained by examples, but the present invention is not limited by these examples.

<Preparation of the (A) Linear Polyacetal Copolymer> from the discharge opening provided at the other end of the polymerization device, in order to quench the polymerization catalyst, the quenching agent shown in Table 1 was added. In Table 1, the amount of the quenching agent is a weight ratio with respect to the crude polyacetal copolymer (units: ppm). Next, 0.3 parts by weight of triethyleneglycol bis[3-(3-t-butyl-5-methyl-4-hydroxyphenyl)propionate] was added as an antioxidant, and using a twin screw extruder with a vent, melt kneading and extrusion were performed at a temperature of 220° C. with a degree of vacuum of 5 mmHg of the vent portion. A linear polyacetal copolymer was obtained through the above mentioned process.

[Copolymer No. A2-1]

Using boron trifluoride in the gaseous state as a catalyst, this was carried out in the same way as for the above described Nos. A1-1 to A1-5 up to the discharge of the crude polyacetal copolymer from the discharge output provided at the other end of the polymerization device. The discharged reaction product was promptly passed through a crusher, and the catalyst was quenched by adding an aqueous solution comprising 0.05 weight % of triethylamine at 60° C. Further, by separating, washing and drying, a crude polyacetal copolymer was obtained. Next, with respect to 100 parts by

TABLE 1

| | Production Conditions | | | | | characteristics of the copolymer | |
|---|---|---|---|---|---|---|---|
| Linear Polyacetal Copolymer | Comonomer Amount mol % with respect to (Trioxane + comonomer) | Polymerization Catalyst | | Quenching Agent | | Oxyalkylene Amount (Oxyethylene Amount) mol % with respect to (oxymethylene unit + oxyethylene unit) | Melt Index g/10 min |
| | | Type | Amount ppm | Type | Amount ppm | | |
| A1-1 | 1.3 | phosphotungstic acid | 2 | sodium stearate | 10 | 0.5 | 13.1 |
| A1-2 | 1.5 | phosphomolybdic acid | 2 | sodium carbonate | 10 | 0.7 | 12.8 |
| A1-3 | 1.3 | isopolytungstic acid | 2 | calcium stearate | 20 | 0.5 | 13.5 |
| A1-4 | 1.3 | phosphotungstic acid | 2 | melamine | 300 | 0.5 | 13.8 |
| A1-5 | 2.5 | phosphotungstic acid | 2 | sodium stearate | 10 | 1.1 | 13.6 |
| A2-1 | 1.3 | boron tri-fluoride | 20 | triethylamine aqueous solution | | 0.5 | 13 2 |

Melt Index Measurement Apparatus: The melt index was measured using a Melt Indexer L202 (by Takara Thermistor Co. Ltd.) with a load of 2.16 kg, at a temperature of 190° C.

[Copolymer Nos. A1-1 to A1-5]

A continuous twin screw polymerization device was used as the polymerization reaction apparatus. This polymerization device, at its outside has a jacket for passing a medium for heating or for cooling, and at its inside has two rotating axes having a plurality of paddles for stirring and propulsion disposed in the lengthwise direction. A heating medium at 80° C. was passed through the jacket of this twin screw polymerization device, and while the two rotating axes were rotated at a fixed speed, 1200 ppm of methylal as a chain transfer agent was continuously supplied at one end thereof, and a mixed liquid of trioxane and 1,3-dioxolane as a comonomer was continuously added in the amount shown in Table 1, and to the above mixed liquid, a methyl formate solution comprising 0.3 parts by weight of the polymerization catalyst shown in Table 1 was continuously added in the amount shown in Table 1 with respect to all monomers, and the copolymerization was thus carried out. In Table 1, the added amount of the polymerization catalyst is a weight ratio with respect to the total of all monomers (units: ppm). After this, as a crude polyacetal copolymer was discharged weight of this crude polyacetal copolymer, 3 weight % of a 5 weight % aqueous solution of triethylamine, and 0.3 weight % of pentaerythritol-tetrakis[3-(3,5-di-tert-butyl-4-hydroxyphenyl)propionate] were added, melt kneading was carried out in a twin screw extruder at 210° C. and unstable portions were eliminated, and the linear polyacetal copolymer according to copolymer No. A2-1 was obtained.

<Preparation of the (B) Branched.Crosslinked Polyacetal Copolymer>

[Copolymer No. B1 (Trifunctional)]

Other than the composition of the raw materials being 98.9 parts by weight of (b1) trioxane, 0.2 parts by weight of (b2) trimethylolpropane triglycidyl ether (TMPTGE), and 1.1 parts by weight of (b3) 1,3-dixololane, the branched·crosslinked polyacetal copolymer according to the copolymer No. B1 was obtained by the same technique as the copolymer No. A2-1. At this time, the melt index of the branched.crosslinked polyacetal copolymer according to the copolymer No. B1 was 1.1 g/10 min.

[Copolymer No. B2 (Tetrafunctional)]

Other than the component (b2) being not trimethylolpropane triglycidyl ether (TMPTGE) but pentaerythritol tetraglycidyl ether (PETGE), the branched.crosslinked polyacetal copolymer according to the copolymer No. B2 was obtained by the same technique as the copolymer No. B1. At this time, the melt index of the branched.crosslinked polyacetal copolymer according to the copolymer No. B2 was 1.3 g/10 min.

[Copolymer No. B3 (Bifunctional)]

Other than the component (b2) being not trimethylolpropane triglycidyl ether (TMPTGE) but butanediol diglycidyl ether (BDGE), the branched.crosslinked polyacetal copolymer according to the copolymer No. B3 was obtained in the same way as the copolymer No. B1. At this time, the melt index of the branched.crosslinked polyacetal copolymer according to the copolymer No. B3 was 1.2 g/10 min.

Examples and Comparative Examples the Examples and Comparative Examples in accordance with ISO 179/IeA. Then, the Charpy impact strength test values were measured at 23° C. in accordance with ISO 179/IeA. The results are shown in Table 3

[Evaluation of the Formaldehyde Generation Amount]

The pellets of the Examples and Comparative Examples were filled into a cylinder maintained at 200° C., and after melting for 5 min, the melt was extruded from the cylinder into an airtight container. Nitrogen gas was flowed into this airtight container, and the formaldehyde gas included in the outgoing nitrogen gas was dissolved in water and collected, and by measuring the formaldehyde concentration in the water, the weight of formaldehyde released by the melt was determined. This formaldehyde weight was divided by the

TABLE 2

| | | | | (A) Component Linear POM Copolymer | | | | (B) Component Branched•Crosslinked POM Copolymer | | |
|---|---|---|---|---|---|---|---|---|---|---|
| | No. | Catalyst | Quenching Agent | Comonomer Amount (Oxyethylene Amount) mol % with respect to (oxymethylene unit + oxyethylene unit) | Blending Amount (parts by weight) | MI (g/10 min) | No. | | Blending Amount (parts by weight) | MI (g/10 min) |
| Example | 1 | A1-1 | heteropoly acid | metal salt | 0.5 | 100 | 13.1 | B1 (trifunctional) | 0.2 | 1.1 |
| | 2 | A1-1 | heteropoly acid | metal salt | 0.5 | 100 | 13.1 | B1 (trifunctional) | 0.2 | 1.1 |
| | 3 | A1-1 | heteropoly acid | metal salt | 0.5 | 100 | 13.1 | B2 (tetrafunctional) | 1 | 1.3 |
| | 4 | A1-2 | heteropoly acid | metal salt | 0.7 | 100 | 12.8 | B1 (trifunctional) | 1.5 | 1.1 |
| | 5 | A1-3 | isopoly acid | metal salt | 0.5 | 100 | 13.5 | B2 (tetrafunctional) | 0.5 | 1.3 |
| | 6 | A1-4 | heteropoly acid | metal salt | 0.5 | 100 | 13.8 | B1 (trifunctional) | 0.5 | 1.1 |
| Comparative Example | 1 | A2-1 | boron trifluoride | triethylamine | 0.5 | 100 | 13.2 | B1 (trifunctional) | 0.5 | 1.1 |
| | 2 | A1-1 | heteropoly acid | metal salt | 0.5 | 100 | 13.1 | B3 (bifunctional) | 0.5 | 1.2 |
| | 3 | A1-5 | heteropoly acid | metal salt | 1.1 | 100 | 13.6 | B1 (trifunctional) | 0.5 | 1.1 |
| | 4 | A1-1 | heteropoly acid | metal salt | 0.5 | 100 | 13.1 | B1 (trifunctional) | 3 | 1.1 |
| | 5 | A1-1 | heteropoly acid | metal salt | 0.5 | 100 | 13.1 | — | 0 | — |

Examples and Comparative Examples

[Preparation of the Polyacetal Resin Composition]

The (A) component and the (B) component obtained in <Preparation of the (A) Linear Polyacetal Copolymer> and the <Preparation of the (B) Branched.Crosslinked Polyacetal Copolymer> were blended in the proportions shown in Table 2, melt-kneaded in a twin screw extruder at 210° C., and the polyacetal resin compositions in pellet form according to the Examples and Comparative Examples were obtained.

[Evaluation]

In order to evaluate the polyacetal resin composition in pellet form according to the Examples and Comparative Examples, the flexural modulus of elasticity, the Charpy impact strength, and the formaldehyde generation amount were measured.

[Flexural Modulus of Elasticity]

Using an injection molding device (SE100DU made by Sumitomo Heavy Industries, Ltd.), under the conditions of cylinder temperature: 205° C.; die temperature: 90° C.; test pieces (4 mm×10 mm×80 mm) were molded from the pellets of the Examples and Comparative Examples. After this, the flexural modulus of elasticity of the test pieces was measured in conformance with ISO 178. The results are shown in Table 3.

[Charpy Impact Strength]

Using the above-described injection molding device, notched Charpy test pieces were formed from the pellets of weight of the melt and taken as the formaldehyde generation amount (units: ppm). The results are shown in Table 3.

TABLE 3

| | Flexural Modulus of Elasticity (Stiffness) MPa | Charpy Impact Strength (Toughness) KJ/m$^2$ | Formaldehyde Generation Amount ppm |
|---|---|---|---|
| Example | | | |
| 1 | 2800 | 7.0 | 60 |
| 2 | 2850 | 6.8 | 65 |
| 3 | 2900 | 6.2 | 65 |
| 4 | 2950 | 6.5 | 58 |
| 5 | 2870 | 6.8 | 65 |
| 6 | 2800 | 6.8 | 80 |
| Comparative Example | | | |
| 1 | 2830 | 4.5 | 100 |
| 2 | 2650 | 6.4 | 73 |
| 3 | 2670 | 6.4 | 50 |
| 4 | 3000 | 5.1 | 65 |
| 5 | 2600 | 7.0 | 66 |

By using a polyacetal resin composition comprising a suitable proportion of the (A) component and the (B) component, the stiffness and toughness are both excellent, while the formaldehyde generation amount can be suppressed to a low level (Examples).

On the other hand, when producing the (A) component, when the polymerization catalyst is not a heteropoly acid, even when blending in a suitable proportion with the (B) component, it was confirmed that the Charpy impact strength (notched, 23° C.) was below 6 kJ/m², and in addition to not obtaining sufficient toughness, more formaldehyde was generated compared to the case of using a heteropoly acid as the polymerization catalyst (Comparative Example 1).

Further, concerning the (b2) compound having from 3 to 4 cyclic ether units in each molecule included in the (B) component, if there are 2 cyclic ether units included in each molecule in the compound, even when blending in a suitable proportion with the (A) component, it was confirmed that the flexural modulus of elasticity of the test piece in conformity with ISO 178 was below 2700 MPa, and sufficient stiffness could not be obtained (Comparative Example 2).

Further, when the proportion of the comonomer (oxyalkylene units) included in the (A) component exceeded 0.9 mol % as a proportion accounting for the constituent units of the linear polyacetal copolymer, even when blending in a suitable proportion with the (B) component, it was confirmed that the flexural modulus of elasticity of the test piece in conformity with ISO 178 was below 2700 MPa, and sufficient stiffness would not be obtained (Comparative Example 3).

Further, if the content of the (B) component exceeds 2 parts by weight with respect to 100 parts by weight of the (A) component, even when the structures of the copolymers according to the (A) component and the (B) component are suitable, it was confirmed that the Charpy impact strength (notched, 23° C.) was below 6 kJ/m², and sufficient toughness could not be obtained (Comparative Example 4).

Further, if the content of the (B) component is below 0.1 parts by weight with respect to 100 parts by weight of the (A) component, even when the structures of the copolymers according to the (A) component and the (B) component are suitable, it was confirmed that the flexural modulus of elasticity of a test piece in conformity with ISO 178 was below 2700 MPa, and sufficient stiffness could not be obtained (Comparative Example 5).

The invention claimed is:

1. A method for producing a polyacetal resin composition comprising a step of blending, with respect to 100 parts by weight of (A) a linear polyacetal copolymer comprising an oxymethylene unit as a main constituent component and an oxyalkylene unit as a comonomer in a percentage of from 0.4 mol % to 0.9 mol % of the constituent units of the linear polyacetal copolymer, and produced with at least one selected from a heteropoly acid, an isopoly acid, or an acid salt thereof as a polymerization catalyst;

from 0.1 parts by weight to 2 parts by weight of (B) a polyacetal copolymer having a branched or crosslinked structure which is a copolymer of (b1) trioxane, (b2) a compound having from 3 to 4 cyclic ether units in each molecule, and (b3) compound having one cyclic ether unit in each molecule.

2. A method for producing a polyacetal resin composition according to claim 1, wherein in a catalyst quenching when producing the (A) linear polyacetal copolymer, a melt kneading treatment is carried out using a carbonate, bicarbonate, or carboxylate of an alkali metal element as a quenching agent.

* * * * *

UNITED STATES PATENT AND TRADEMARK OFFICE
CERTIFICATE OF CORRECTION

PATENT NO.         : 9,834,669 B1                                  Page 1 of 1
APPLICATION NO.    : 15/538008
DATED              : December 5, 2017
INVENTOR(S)        : Tadahiro Horiguchi and Akihide Shimoda It is certified that error appears in the above-identified patent and that said Letters Patent is hereby corrected as shown below:

In the Specification

Column 3, Line 39, "compolymer" should be --copolymer--.

Column 4, Line 34, "compolymer" should be --copolymer--.

Column 5, Line 55, "MI" should be --$M^I$--.

Column 5, Line 56, "MV" should be --$M^V$--.

Column 5, Line 58, "MVI" should be --$M^{VI}$--.

Column 8, Line 7, "1,5-pentadiol" should be --1,5-pentanediol--.

Column 9-10, Line 38 (approx.), "tri-fluoride" should be --trifluoride--.

Column 10, Line 56 (approx.), "1,3-dixololane," should be --1,3-dioxolane,--.

Column 12, Line 4, After "3" insert --.--.

Signed and Sealed this
Twenty-second Day of May, 2018

Andrei Iancu
*Director of the United States Patent and Trademark Office*